United States Patent [19]

Zebuhr

[11] 4,263,896
[45] Apr. 28, 1981

[54] SOLAR PANEL

[75] Inventor: William H. Zebuhr, Nashua, N.H.

[73] Assignee: Sunhouse, Incorporated, Nashua, N.H.

[21] Appl. No.: 868,372

[22] Filed: Jan. 10, 1978

[51] Int. Cl.³ ............................................. F24J 3/02
[52] U.S. Cl. ................................. 126/450; 126/444; 126/448; 126/417; 165/485
[58] Field of Search ............... 126/270, 271, 428, 450, 126/448, 445, 418, 417; 237/1 A; 165/48 S, 169-170

[56] References Cited

U.S. PATENT DOCUMENTS

| | | | |
|---|---|---|---|
| 1,931,750 | 10/1933 | Blaski | 52/72 |
| 4,114,597 | 9/1978 | Erb | 165/172 |
| 4,128,096 | 12/1978 | Katz | 237/1 A |
| 4,146,011 | 3/1979 | Thomason et al. | 126/448 |
| 4,150,659 | 4/1979 | Buckley | 126/270 |
| 4,150,661 | 4/1979 | Trimboli Callegari et al. | 126/445 |

FOREIGN PATENT DOCUMENTS

| | | | |
|---|---|---|---|
| 2607188 | 8/1977 | Fed. Rep. of Germany | 126/270 |
| 2826832 | 1/1979 | Fed. Rep. of Germany | 126/450 |
| 2319858 | 2/1977 | France | 126/271 |

Primary Examiner—James C. Yeung
Assistant Examiner—Larry Jones
Attorney, Agent, or Firm—Donald P. Gillette

[57] ABSTRACT

A solar radiation absorbing structure including a plate comprising a plurality of co-planar fluid passageways joined side by side and having at least one radiation transmissive cover extending over the passageways. The opposite longitudinal edges of the plate parallel to the passageways and the corresponding longitudinal edges of the cover are interlocked with longitudinal rails to support the passageway plate and cover spaced from the roof structure. Only one part of each rail and plate and cover is locked in place on the roof; the remainder is free to move in response to thermal expansion and contraction. Manifolds at each end of the plate connect to the passageways to transmit liquid to and from the passageways. At each end of the cover a member, which may be hinged, forms, with the manifolds, a substantially airtight enclosure in cold weather.

17 Claims, 5 Drawing Figures

SOLAR PANEL

BACKGROUND OF THE INVENTION

1. Field of the Invention

This invention relates to the field of structures to absorb solar radiation in liquid flowing in passageways in a panel, the structures being provided with interlocking glazing panels which, together with panels carrying the liquid, may be slidably assembled with rails attached to a supporting structure.

2. The Prior Art

Typical solar panels consist of an assembly of a shallow pan, or collector plate, with water passages attached to the plate or formed with it as part of an extruded structure. A sheet of transparent glazing material covers the collector plate and is sealed to the edges of it so that the water passages are insulated from the atmosphere but can receive the solar radiation through the glazing without being cooled by the air. Some panels have two such transparent sheets and are commonly referred to as double-glazed panels. The solar panels are typically placed on a completed roof and rest on the roofing material that furnishes the required weatherproofing.

Such panels are made up of separate components of different materials that must be hand assembled to form a finished panel. Furthermore, they are not intended to take the place of the customary roofing material and so they constitute an extra expense over the cost of the structure with which they are to be used. If one panel must be serviced, for example to seal a leak or replace the glazing, it is difficult to separate it from the other panels and to replace it after service has been performed on it.

I have previously proposed extruded panels formed of a suitable plastic material, such as Plexiglas, or a polycarbonate material, such as Lexan. It is possible to extrude such material to form panels several feet wide and as long as may be desired. Such panels included several passages for liquid to be heated by solar radiation. These passages were formed side by side and joined one to the other in the extrusion process, thereby forming a passageway plate.

In my previously proposed structure, the cover was also formed in the same extrusion process and spaced fron the passages and attached to them by ribs extending from the passageway plate. The passages carried the liquid to be heated by solar radiation and the cover enclosed a dead-air insulating space over the passages. The opposite edges of the structure included flanges that either interlocked directly with flanges of the next adjacent panels in an overlapping manner to form a waterproof structure or interlocked with a flanged member previously nailed to the roof on which the panels are placed. At least one supporting rib extended downwardly from the liquid passages to the roof to support the panel from the roof with an additional dead-air space between the lower surface of the passageway plate and the roof. This additional dead-air space provided further insulation of the roof and minimized the direct loss of heat from the passages to the roof.

One of the advantages of my prior structure: simplification by extrusion of the passageway plate, ribs, interlocking edge, and cover as a unit, was also sometimes a disadvantage in requiring rather complex extrusion molds. Damage to part of each complex panel could also result in having to replace that entire panel.

Another disadvantage is that during the hot weather in summer, the space enclosed by the structure could get excessively hot. This would occur just at the time that it was unnecessary to run liquid through the passageways to be heated by radiation from the sun, and such excess heat could be detrimental to the plastic or could require that a more expensive extrudable material capable of withstanding such heat be used.

OBJECTS AND SUMMARY OF THE INVENTION

It is one of the objects of this invention to provide a solar panel structure of greater simplicity than heretofore.

Another object is to provide a solar panel structure that can be more easily assembled at the building site than heretofore.

A further object is to provide ventilating means actuated by expansion of the panel structure in hot weather to allow air to circulate within spaces that, in cold weather, are dead-air spaces in the structure.

In accordance with the invention, an extruded passageway plate is formed with ribs that space and support it from a substructure, such as the wooden sheathing of a roof or wall of a building. The plate also has ribs extending from its opposite surface to support a cover, or glazing. The edges of the plate parallel to the passageways are interlocked with a tie-down structure, such as an extruded aluminum rail along each edge, and the corresponding edges of the glazing are also held by the same rails. The rails are provided with flanges that engage or overlap the longitudinal edges of the panels. Caps that also extend longitudinally along the rails and are interlocked therewith to spread over the longitudinal edges of each glazing to hold the latter firmly in place. Manifolds at each end of each passageway plate provide means to transfer liquid to and from the passages.

Aluminum has a relatively high coefficient of thermal expansion, but plastic of a type suitable for the plate, such as Plexiglas or acrylic material or Lexan or other polycarbonate material, has an even higher coefficient of thermal expansion. Hence the support rails are firmly affixed to the roof only at one point, preferably the upper end, and the remainder of each rail is clamped in such a way that it is free to slide longitudinally in response to thermal expansion and contraction. The plate and cover are free to slide even more.

Along the upper and lower ends of the cover are members that extend in a direction transverse to the rails and enclose the space under the glazing airtight. These members may be in the form of hinged flaps normally closed to provide the desired airtight junctions with the cover and the roof. The flap at the end of the plate that can move most freely due to thermal expansion and contraction has a projecting member that extends into the path of the heat-expanding plate. Such heat expansion, which can exert a force of several tons on the projecting member, pivots that flap open. In order to open the other flap at the same time, the two flaps are connected together, for example by a wire.

DETAILED DESCRIPTION OF THE INVENTION

Figure 1:
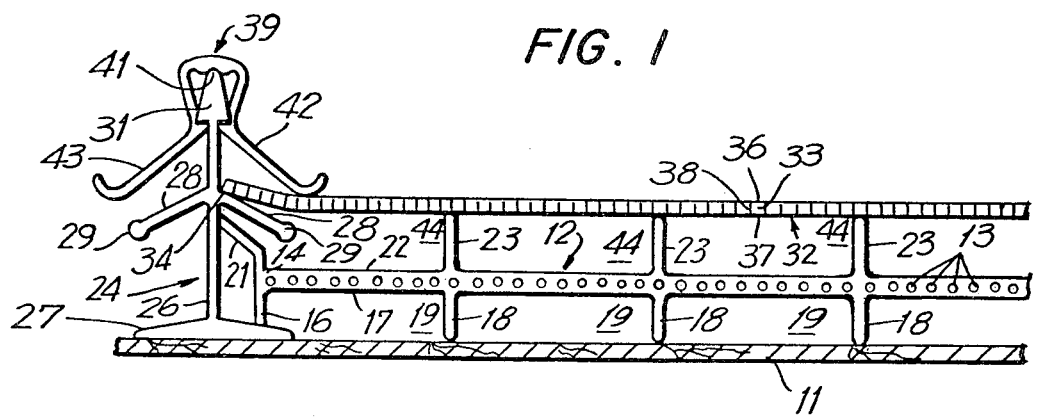
FIG. 1 shows an end view of one embodiment of an assembly of a passageway plate, cover, and one edge support member in accordance with this invention.

The structure in FIG. 1 is assembled on a substructure 11, which is usually the roof of a building that is to be heated by solar energy but may be the side wall thereof or may even be entirely removed from the building. The central component is a plate, or panel, 12 extruded of a suitable material such as acrylic or polycarbonate material. Plexiglas and Lexan are two particularly suitable materials. The plate 12 is extruded so as to have passages 13 extending longitudinally through it. These passages are naturally parallel to each other and to the longitudinal edges of the plate, of which only one edge 14 is shown in the drawing. The plate 12 is also extruded with one set of ribs 16 extending from one surface 17 of the plate 12 at the edge 14 and additional ribs 18 extending parallel to the rib 16 and the same height above the surface 17 as the rib 16 and spaced apart across the central region of the plate. These ribs 16 and 18 support the plate 12 so that it is spaced from the substructure 11 to create, in the combined structure, a series of dead-air spaces 19 that insulate the plate 12 and the substructure 11 from each other. The plate 12 also has a rib 21 extruded from its opposite surface 22 at the edge 14 and additional ribs 23 extruded from the same surface and each extending the same distance from the surface 22 as the rib 21.

The plate 12 is held in place by two rails 24, only one of which is shown in the drawing. The rails are preferably also extruded of a suitable material, such as aluminum, and each rail comprises a vertical web 26 and a base flange 27 that rests on the substructure 11. Spaced from the flange 27 are two flanges 28 that extend outwardly and slightly downwardly from the web 26. The flanges 28 do not extend as far out as the flange 27, and they have rounded edges 29 of somewhat greater diameter than the thickness of the flanges 28. At the upper edge of the web 26 is a section 31 slightly thicker than the thickness of the web just below that section.

The purpose of each of the flanges 28 is to form a support for one longitudinal edge of a cover 32. The cover may take various forms, such as a single glazing of suitable plastic, or it may be, as shown, an extruded double glazing. It will be referred to hereinafter simply as a glazing 32.

Figure 2:
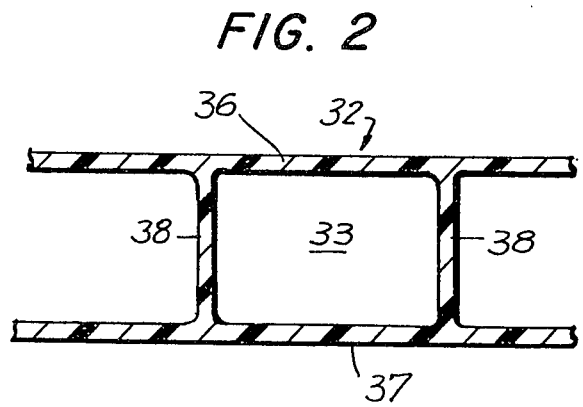
FIG. 2 is an enlarged fragment of the glazing in FIG. 1.

The form of glazing 32 shown in FIG. 2 is extruded of Lexan and has an overall thickness of about 0.25 inch. It is divided into passages 33 that extend parallel to the edge 34 that rests on the flange 28. The cross-section of each passage 33 is almost square, and Lexan is so strong that, although the upper wall 36, the lower wall 37 and the vertical walls 38 between passages are each only approximately 0.016 inch thick, the glazing 32 will withstand any load likely to be placed on it. The dead-air space within each channel serves as additional heat insulation, but the thin walls 36 and 37 are extremely transparent to solar radiation, allowing almost all of the incident radiation to pass through the cover and be absorbed by the black plate 12 and the liquid flowing through it.

As shown in FIG. 1, the region of the glazing 32 adjacent the edge 34 is held in place by an extruded aluminum cap 39 that has a central channel 41 just wide enough to snap over and engage firmly the enlarged section 31. The cap 39 can also be slid into place lengthwise along the enlarged section. The cap has two flanges 42 and 43 that flare out from the central part a distance greater than the outermost parts 29 of the flanges 28. In addition, the flanges 42 and 43 extend downwardly so that they press firmly against the upper surface 36 of the cover 32. Since this pressure is exerted beyond the flanges 28, it exerts a bending force that tends to bend the glazing 32 down slightly and to hold it firmly in place. The central area of the cover rests on the edges of the ribs 23, which separates the dead-air space between the plate 11 and the glazing 32 into separate sections 44.

Figure 3:
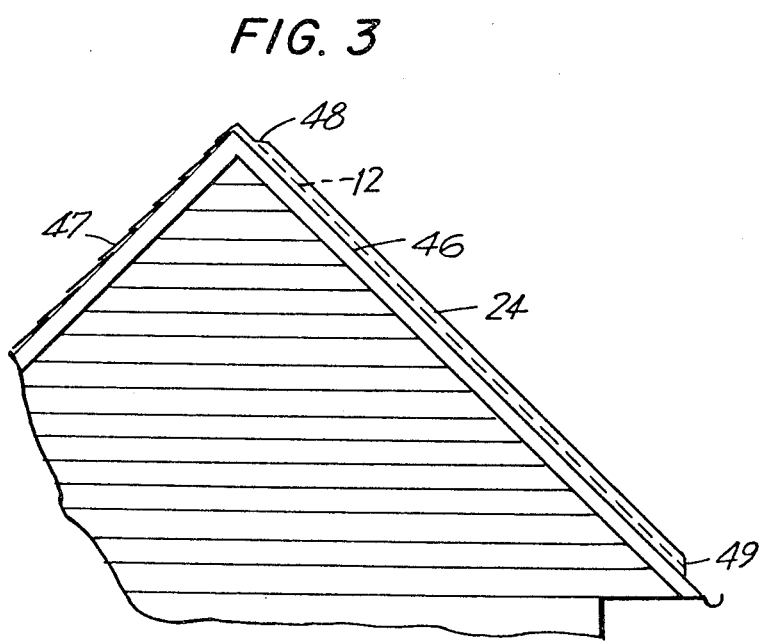
FIG. 3 is a side view of a part of a building supporting a structure such as is shown in FIG. 1.

FIG. 3 shows a side view of a roof 45 that may form the substructure 11 for the structure in FIG. 1. The roof includes one part 46 that faces in a generally southerly direction toward the sun and another part 47 that faces in a northerly direction, away from the sun. The rails 24 and plates 12 and glazing panels 32 are on the part 46, which is tilted at an angle to receive the sun substantially directly in the winter. At the upper end of the rails 24 and the plates 12, which are behind the rails in this view, is a closure structure 48 that closes the upper ends of the dead-air spaces 19 and 44 and also contains a manifold to connect to the liquid passages 13 shown in FIG. 1. The closure structure 48 may also include venting means, as will be described hereinafter. At the lower end of the rails 24 is another closure structure 49 that will also be more fully described hereinafter.

The rails 24 in FIGS. 1 and 3 may be attached directly to the wooden sheathing on which roofing material is normally placed. Since the rails and the plates 12 and glazing panels 32, together with the closure structures 48 and 49 completely cover an area of the roof section 46, it is unnecessary to cover the same area first with the usual roofing material. For this reason, it is desirable to attach the upper ends of the rails 24 at the ridge of the roof to allow flashing to extend over the ridge and under the other part 47 of the roof that faces away from the sun. The lower ends of the rails 24 should be held in place in such a way that the rails can expand when they are hot and contract when they are cold. Additional flashing may cover the lowermost part of the roof section 46 to make that section completely weatherproof.

Figure 4A:
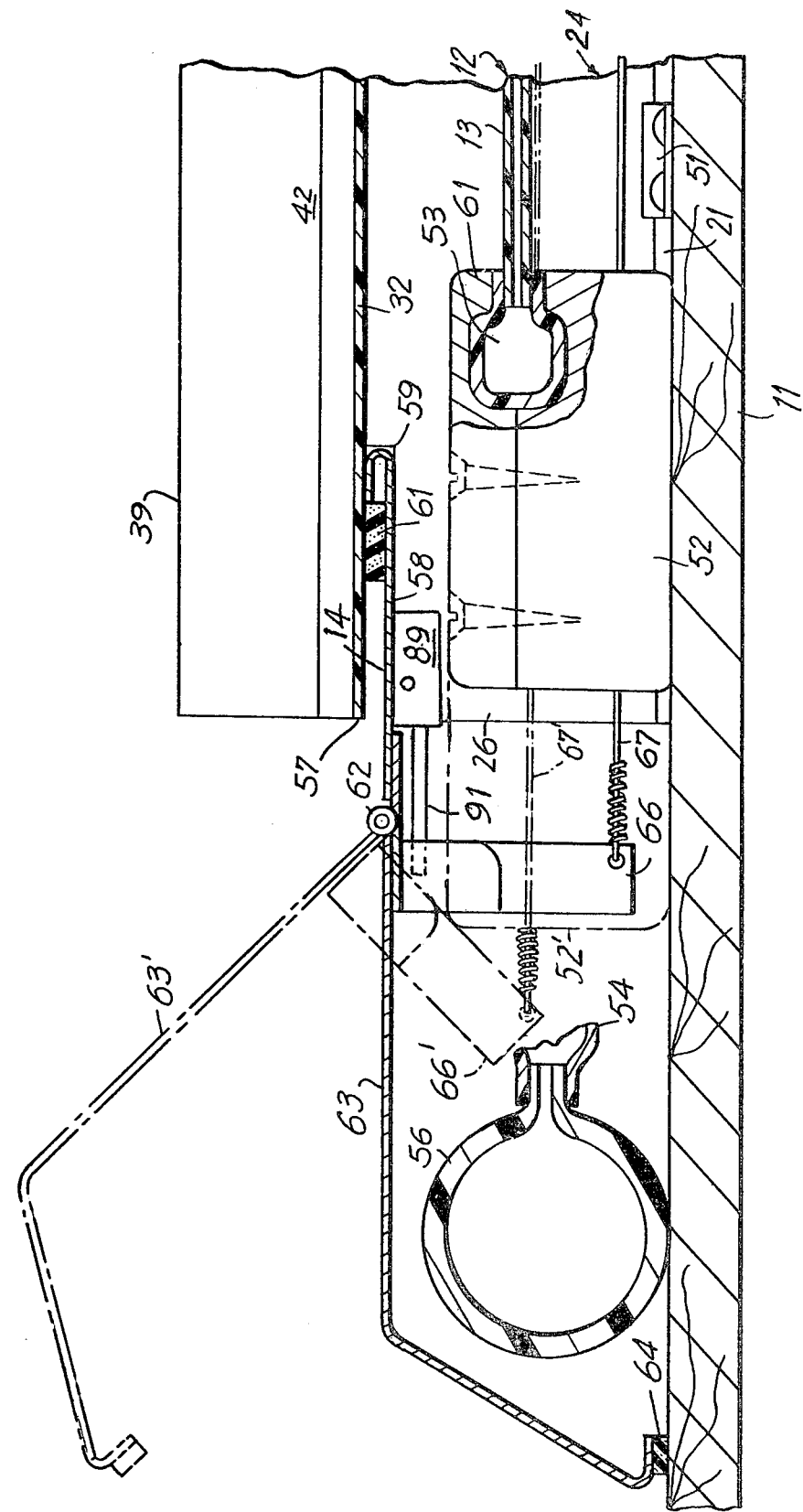
FIGS. 4a and 4b are enlarged and detailed views of the flaps and actuating arrangement at the ends of the structure in FIG. 2.

The structure 24 in FIG. 4a rests on the substructure 11. The base flange 27 of the rail is held down by a clip 51 that permits the rail to expand longitudinally with heat and contract with cold. The plate 12 is clamped in a sliding member 52 that also holds a manifold 53 sealed liquid-tight to each of the passages 13. A bellows tube 54 connects the manifold 53 for each plate 12 to a large, system manifold 56 secured by any convenient means to the substructure 11. This system manifold is the main device for connecting the plates to a central liquid storage tank (not shown).

The glazing 32 extends over the length of the barrier between the plate 12 and the outside air. At the end 57 of the glazing 32, a metal plate 58 extends the barrier still farther. This plate fits into a notch 59 in each of the webs 26, and a gasket 61 helps seal out any air from the outside. At the edge of the plate 58 that extends out beyond the rail web 26 is a piano hinge 62, and a flap 63 is attached to this hinge. The outer lip of the flap is bent downwardly and has a gasket 64 at its extremity to seal against the substructure 11 when the flap is in its closed position as indicated in solid lines.

An actuating member 66 is attached to the flap 63 and extends into the path of movement of the sliding member 52 when the latter is pushed by thermal expansion of the plate 12. The actuating member 66 is connected by suitable means, such as a wire 67, to a ventilating structure at the other end of the closing 32.

The sliding member 52 is placed so that it moves from the position shown in solid lines to the position 52' shown in broken lines in response to the high temperatures experienced in summer. The plate 12 also expands during hours of sufficiently intense sunlight, even in winter, but the expansion is not as great as in summer. Furthermore, in winter, there will typically be a steady flow of liquid through the passages 13 to remove the heat. By properly locating the sliding member 52 relative to the actuating member 66, the flap 63 can be caused to pivot to the position 63', which is shown in broken lines only when the temperature is so high that it is desirable to allow air to flow through the spaces 19 and 44 (FIG. 1) below and above the plate 12. Such positioning of the sliding member 52 also requires that expansion of the rail be taken into account, but this is easy to do. As shown, pivoting the actuating member 66 to the position 66' causes the wire 67 to be pulled along with it to the position 67'.

Figure 4B:
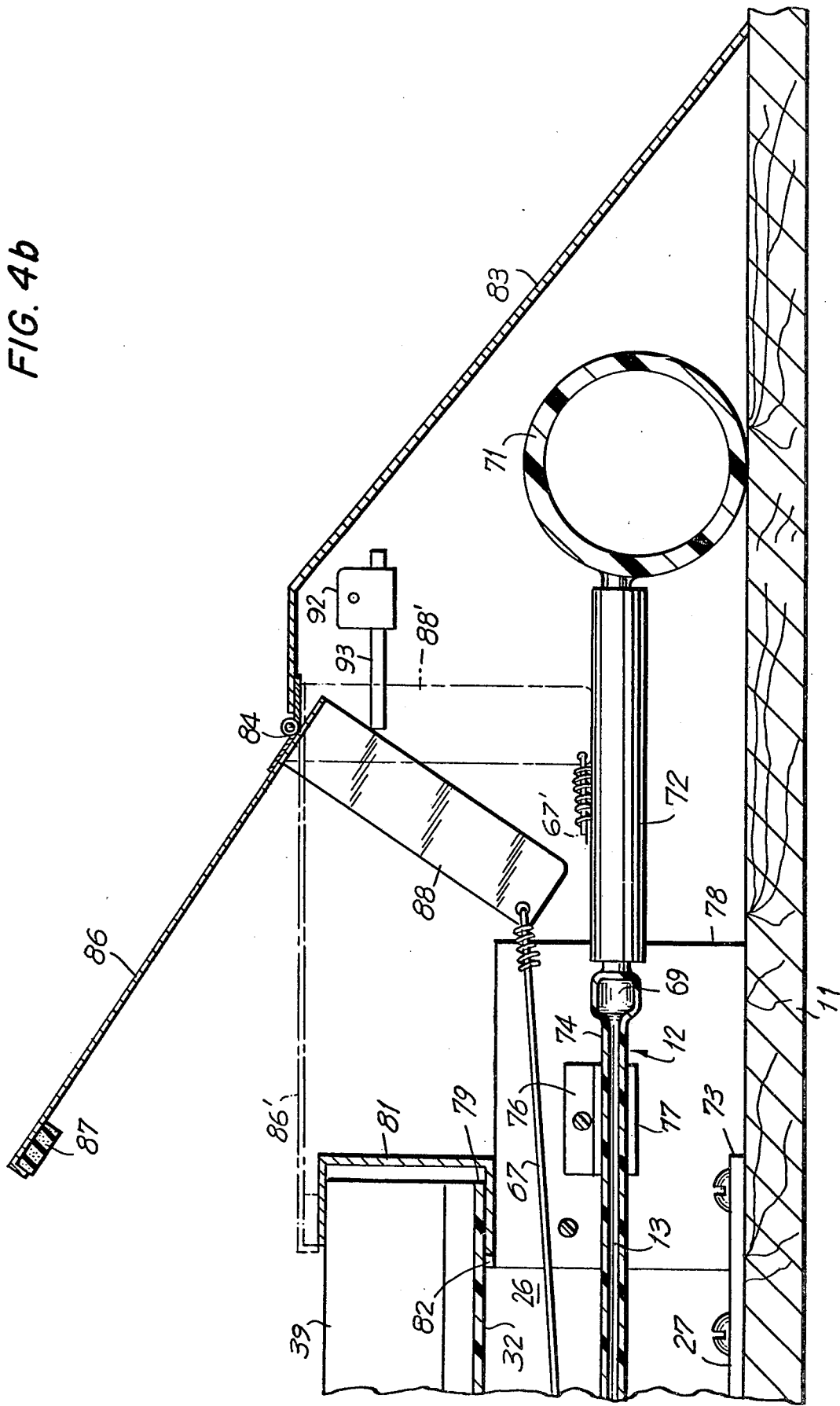

FIG. 4b shows the other end of the plate 12 and glazing 32. A manifold 69 is connected to all of the passages 13 in the plate 12 and this manifold is connected to another system manifold 71 by a piece of tubing 72. The distance between the manifolds 69 and 71 remains relatively fixed, so the tubing 72 does not need to have a bellows effect, unless the central part of the rail and plate 12 are fixedly located on the substructure and both ends are allowed to expand.

The end 73 of the flange 27 is preferably held fixed by being screwed or nailed directly to the substructure 11. The corresponding end 74 of the plate 12 is held fixed by being clamped between two plates 76 and 77 attached to a plate 78. The latter, in turn, is attached to the web 26 of the extruded rail. If the plates 76 and 77 are sheared off, there will normally be a slight burr, which should be placed so that it will press into the plate 12 and help hold the plate firmly. The end 79 of the glazing 32 and the corresponding end of the aluminum cap 39 are held in place by a channel 81, which is locked into a notch 82 cut into the upper edge of the web 26.

The ventilating means includes a sheet metal member 83 affixed to the substructure 11 and extending obliquely over the system manifold 71. At the upper edge of the sheet metal member, which extends the whole width of the glazing 32 or even the whole width of all such covers on a given substructure, is a piano hinge 84. A flap 86 is attached to the underside of the hinge to allow upward pivotal movement but with good weather protection when the flap 86 is closed. The outer edge of the flap closes over the end 79 of the glazing 32 and has a gasket 87 to seal it.

The flap 86 is shown open, as it would be in the summer time when the actuating member 66 (FIG. 4a) was pivoted to its alternate position. The flap 86 has a similar actuator 88 to which the other end of the wire 67 is connected to exert the necessary pull to open the flap 86 simultaneously with the flap 63 in FIG. 4a. When the plate 12 contracts as the temperature lowers in the winter or at night or even in the rain in summer, the flaps 63 and 86 close by the force of gravity, although they may also include springs to bias them closed.

Instead of using the effect of thermal expansion and contraction to open and close the flaps 63 and 86, electric motors may be used. FIG. 4a shows a gearbox 89 for a motor (not shown) and a worm gear 91 to cause the actuating member 66 to pivot the flap 63. A similar gearbox 92 and worm gear 93 are shown in FIG. 4b to cause the actuator 88 to pivot the flap 86. The motors that drive the gearboxes 89 and 92 may be actuated by switches within the building whenever it is desired to open or close the flaps 63 and 86. For example, it may be desirable to open the flaps at night during the summer to allow relatively cool night air to circulate over and under the plate 12 to cool liquid flowing through the passages 13, The cooled liquid can be stored in a main tank to help cool the building the next day.

What is claimed is:

1. A solar panel structure comprising:
   a pair of rails extending parallel to each other, each of the rails comprising first and second edges and a web portion therebetween;
   support means along the first edge of each of the rails to support the respective rail with that edge facing a substructure and the second edge away from the substructure;
   panel support means integrally joined with said web portion and extending transversely from the web portion of each of the rails toward the other of the rails;
   a first panel comprising first and second parallel edges slidably guided by the rails, first and second ends, and a plurality of liquid passages extending along the panel between the ends;
   a glazing panel comprising parallel, longitudinal edge portions engaging the panel support means and the web portion, the glazing panel extending over the first panel and being spaced therefrom to define an air space between the glazing panel and the first panel and between the web portions of the rails;
   means to slidably support the first panel in a fixed position within the space defined by the pair of rails, the glazing panel and the substructure; and
   captivating means engaged with the respective rails and extending over the parallel, longitudinal edge portions of the glazing panel to hold the glazing panel firmly engaged with the panel support means.

2. A solar panel structure according to claim 1 in which the support means on each of the rails extends outwardly from the web portion of the respective rail a predetermined distance, and the captivating means engages the respective rail and extends outwardly therefrom beyond the support means from a first location above the support means and above the proximal part of the edge portion of the glazing panel to a second location lower than the first location by a sufficient amount to exert pressure on the glazing panel tending to bend a portion of the glazing panel between the longitudinal edge portions to be closer to the substructure than the proximal edge portion.

3. A solar panel structure according to claim 2 in which the second edge of each of the rails includes a portion that extends outwardly a greater distance than a portion immediately therebelow, and the captivating means comprises a portion that extends around the second edge and fits under the portion thereof that extends outwardly a greater distance than the portion immediately therebelow.

4. A solar panel structure according to claim 3 in which the portion of each of the captivating means that extends outwardly also has a length at least substantially as long as the respective rail to reduce the possibility of having rain water pass between the respective longitudinal edge portions of the glazing panel and the respective rail.

5. A solar panel structure according to claim 1 in which each of the panel support means comprises a shelf substantially as long as the respective rail, and each of the parallel edges of the first panel comprises a generally upwardly extending rib substantially as long as the respective shelf to collect rain water and reduce the possibility that the rain water can reach the substructure.

6. A solar panel structure according to claim 1 in which the first panel is an extruded thermoplastic material and comprises integrally extruded rib means extending parallel to the parallel edges and being integrally formed on the surface of the first panel facing the substructure to help support the first panel spaced from the substructure.

7. A solar panel structure according to claim 6 comprising at least a second rib substantially symmetrically identical to the first-named rib, the ribs being substantially symmetrically spaced on opposite sides of the center of the first panel.

8. A solar panel structure according to claim 6 in which the first panel comprises additional integrally extruded ribs extending from the opposite surface thereof to engage only spaced regions of said glazing panel between the rails to limit direct conduction of heat from the first panel to the glazing panel.

9. A solar panel structure according to claim 1 in which the glazing panel is freely slidable longitudinally relative to the rails.

10. A solar panel structure according to claim 9 comprising, in addition, means to attach the rails to the substructure to permit limited longitudinal sliding movement of at least one end of each of the rails relative to the substructure.

11. A solar panel structure according to claim 1 comprising:

a first manifold connected liquid-tight with each of the liquid passages at one end of the first panel;

a second manifold connected light-tight with each of the liquid passages at the other end of the first panel;

a first cover extending over the first manifold and joined substantially airtight to one end of the glazing panel and engaging the substructure to form a substantially airtight cover over the first manifold; and a second cover extending over the second manifold and joined substantially airtight to the other end of the glazing panel and engaging the substructure to form a substantially airtight cover over the second manifold, the first and second covers and the glazing panel and the rails and captivating means combining to form substantially airtight means over an area of the substructure.

12. A solar panel structure according to claim 11 in which the first cover comprises a first movable flap, and the second cover comprises a second movable flap, and the solar panel structure comprises means to move both of the flaps between open and closed positions.

13. A solar panel structure according to claim 12 in which the means to move the flaps comprises electrically operated means.

14. A solar panel structure according to claim 13 in which the electrically operated means comprises a first motor actuating the first flap and a second motor actuating the second flap.

15. A solar panel structure according to claim 11 in which the means to move the flaps comprises:

an actuator connected to at least the first flap; and thermally expandable means to engage the actuator to vary the position of the first flap between an open position and a closed position according to thermal expansion and contraction of the thermally expandable means.

16. A solar panel structure according to claim 15 in which the means to move the flaps comprises connecting means connecting the first flap to the second flap to move the second flap between an open position and a closed position in concert with the first flap.

17. A solar panel structure according to claim 15 in which the first panel comprises the thermally expandable means.

* * * * *